Dec. 11, 1951  J. P. BUTTERFIELD  2,578,285
INTERNALLY EXPANDING BRAKE ASSEMBLY
Filed July 20, 1949  2 SHEETS—SHEET 1

INVENTOR.
John P. Butterfield
BY
Harness and Harris
ATTORNEYS

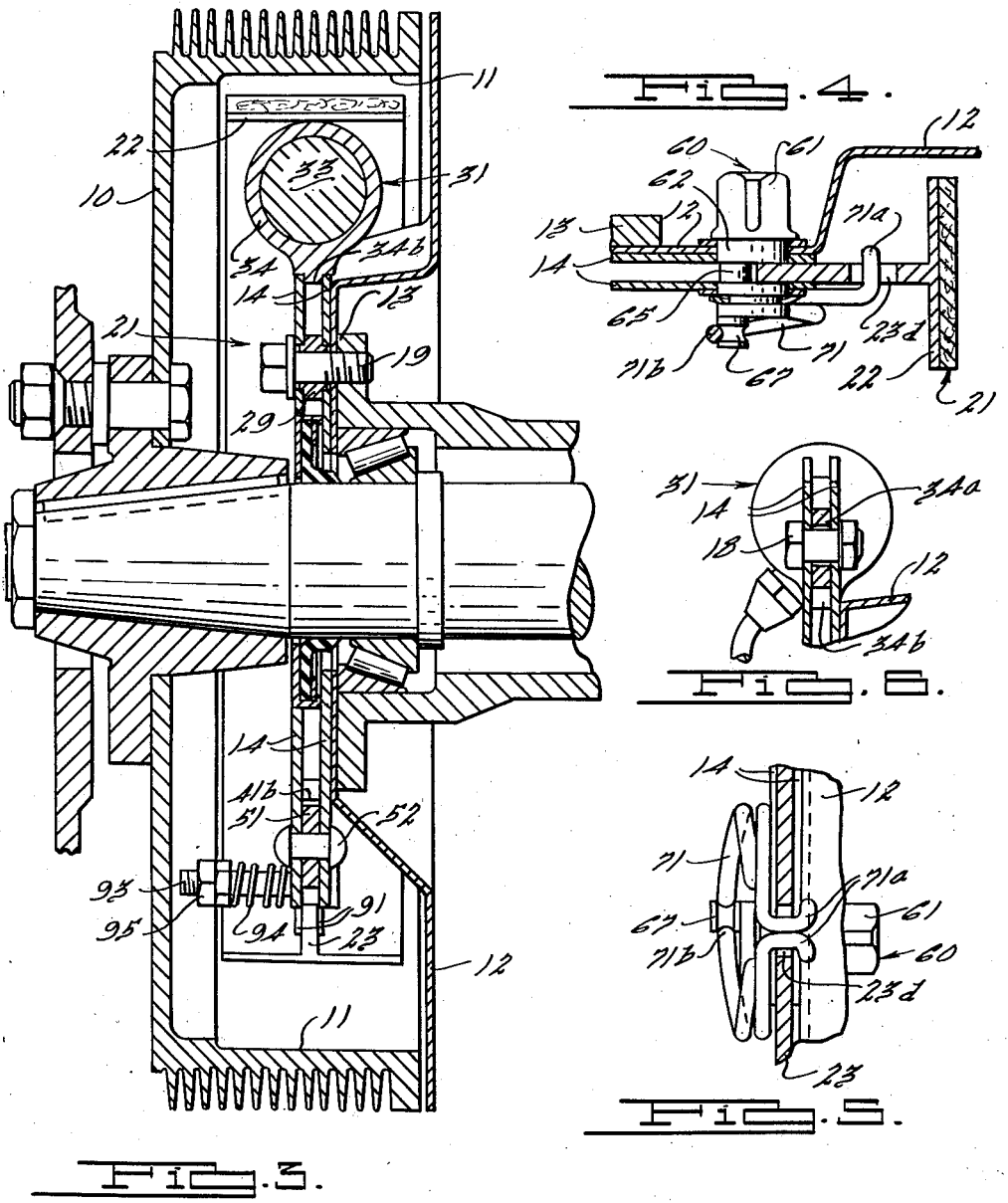

Patented Dec. 11, 1951

2,578,285

UNITED STATES PATENT OFFICE 2,578,285

INTERNALLY EXPANDING BRAKE ASSEMBLY

John P. Butterfield, Grosse Pointe Woods, Mich., assignor to Chrysler Corporation, Highland Park, Mich., a corporation of Delaware Application July 20, 1949, Serial No. 105,804

14 Claims. (Cl. 188—78)

This invention relates to friction brake assemblies of the type having pivotally mounted, link supported, self-adjusting, self-energizing, brake shoes which are adapted to be expanded into engagement with the flange portion of an encircling, rotatable, brake drum. The brake assembly herein disclosed is an improvement on the construction disclosed in the application of Robert F. Smith, Serial No. 56,555 filed October 26, 1948.

It is a primary object of this invention to provide an improved and simplified form of brake assembly composed primarily of stamped elements which elements are arranged in such a manner that the brake shoe actuating mechanism is centered with respect to the members taking the brake reaction. Such an arrangement eliminates torsional loads and turning moments during braking which latter forces cause tilting or cocking of the brake shoes, the development of unnecessarily high stresses in the elements of the brake assembly, and loss of pedal travel during application of the brakes.

It is a further object of this invention to provide a brake assembly in which the brake shoes and the actuating mechanism therefore are mounted on and positioned between a pair of plate-like supporting members which supporting members guide the movement of the shoes and associated brake linkage, take the brake reaction directly, and provide a means whereby the brake assembly may be assembled as a unitary structure for convenient handling and installation.

It is an additional object of this invention to provide a brake assembly in which the number of required elements has been reduced to a minimum and the required elements simplified in design so that they may be formed primarily from relatively light weight, symmetrically shaped stampings. Such a construction makes this brake assembly one that is economical to manufacture and install, yet highly efficient as to braking action, and extremely durable in service.

It is an additional object of this invention to provide a multi-shoe brake assembly in which the several shoes and the actuating linkages therefore are identical in design and readily interchangeable.

It is a further object of this invention to provide a brake assembly in which the spaced, symmetrically arranged brake shoe guiding and supporting members mount the complete shoe actuating mechanism in such a manner that the stresses applied to the assembly during braking are reduced to a minimum and all forces tending to tilt or cock the brake shoes and associated elements are eliminated.

It is another object of this invention to provide a brake assembly in which the movable brake shoes are positively guided during all movement and retained in their most efficient braking position during brake application.

Additional objects and advantages of this invention will be apparent from a reading of the attached specification and a consideration of the related drawings wherein:

Fig. 3 is a sectional elevation taken along the line 3—3 of Fig. 1 disclosing the manner of mounting the brake shoe actuating motors centrally between the reaction absorbing brake shoe guide plates as well as the location of the brake shoe anchor pivots between the guide plates;

Fig. 4 is a sectional elevation taken along the line 4—4 of Fig. 1 disclosing the location of the eccentrically mounted cam means for adjusting the clearance between the brake shoe and the associated brake drum;

Fig. 5 is a sectional elevation taken along the line 5—5 of Fig. 1 disclosing the arrangement of the brake shoe return spring and its association with the cam means for adjusting the brake shoe drum clearance; and Fig. 6 is a sectional elevation taken along the line 6—6 of Fig. 1 disclosing the mounting of the fluid motor ears between the reaction plates.

Figure 1:
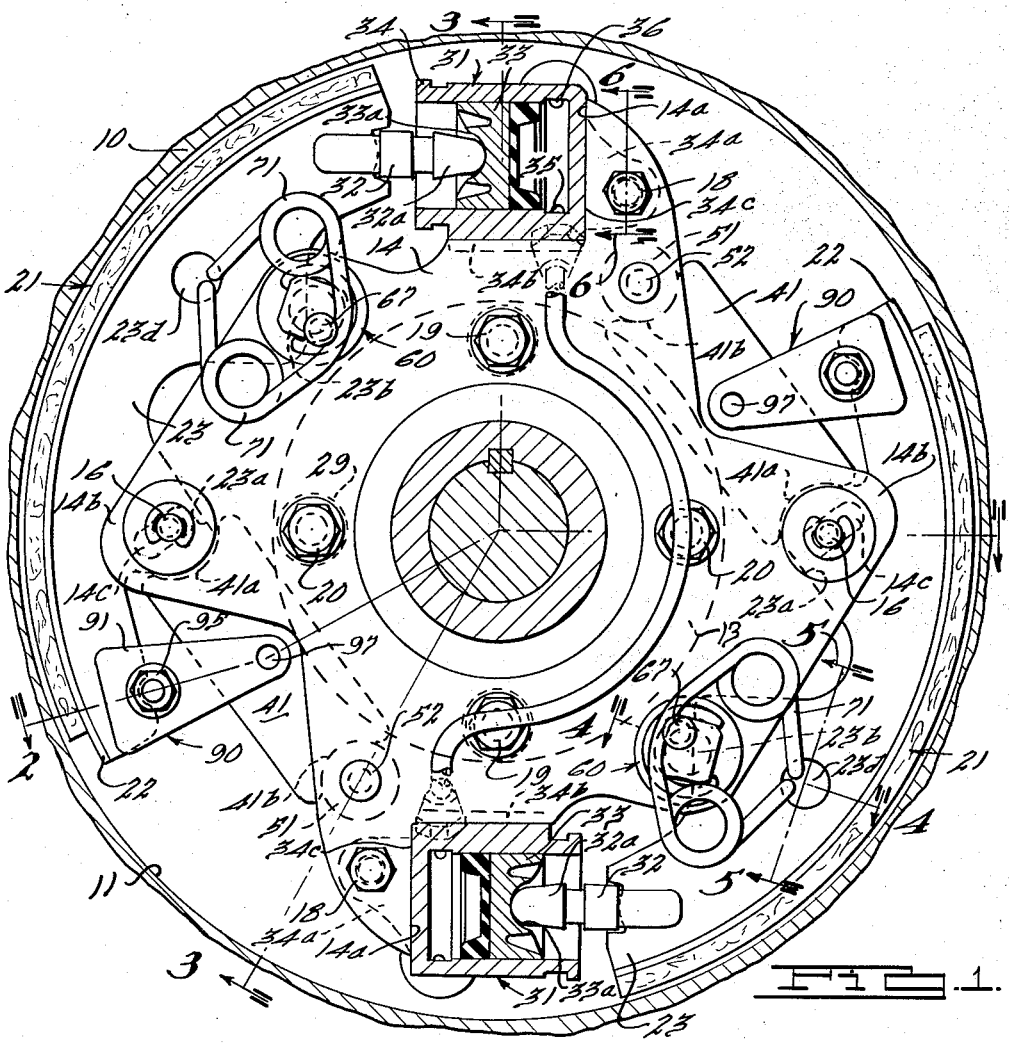
Fig. 1 is a side elevation of a brake assembly embodying this invention, with certain parts thereof being shown in sectional elevation.

Referring to the drawings in detail, the brake assembly embodying my invention includes an annular brake drum 10 which is adapted to be secured to the rotatable member to be braked, such as the road wheel of a motor vehicle. The numeral 12 designates a plate for enclosing the open side of the drum 10, plate 12 being adapted to be mounted on a relatively fixed supporting member 13, such as the rear axle housing or the front steering knuckle of a vehicle chassis, depending on whether the brake assembly is for a rear or front vehicle wheel respectively. Plate 12 in this construction serves only as a dust cover for the brake assembly and is not required to transmit any brake reaction forces due to the fact that the spaced apart plate members 14, which support the brake shoe actuating mechanism on the housing 13, are specifically designed to function as torque plates and thus provide the means for taking the brake reaction between the brake shoes 21 and the brake drum 10. The plates 14 are identical in construction and are each formed with a pair of diametrically disposed, L-shaped seat portions 14a which are formed as indentations along the periphery of the plates 14. The seats 14a are adapted to receive the fluid brake shoe actuating motors 31 which are subsequently described in detail. Plates 14 also include the diametrically disposed portions 14b which are spaced approximately ninety degrees circumferentially from the L-shaped seat portions 14a. Portions 14b of the spaced plates 14 provide slots between which the finger-like projecting portions 23a of the brake shoe web portions 23 may be guidingly mounted. Pins 16 extend through aligned slots 14c in the plates 14 and through openings in the web portions 23a of the brake shoes to loosely anchor the brake shoes 21 to the plates 14. The spaced apart plates 14 are connected to the relatively fixed housing member 13 by the bolts 19 and 20 respectively. Spacer members 29 are mounted on the bolts 19 and 20 inbetween the plates 14 to maintain the spaced relationship of the plates 14 and provide a rigid connection between the plates 14 and housing 13.

The brake shoe actuating mechanism for each wheel assembly is mounted on and positioned between the plate members 14. This actuating mechanism comprises the hydraulically operated motors 31, the pivotally mounted, brake shoe supporting links 41, and the pivot link anchor members 51. As the centrally arranged brake shoes web portions 23a, the pivot links 41, the link anchor members 51, and the actuating motors 31 are all arranged with their force transmitting portions positioned centrally between the plate members 14, an arrangement is provided in which there is little chance for the development of torsional loads or bending moments that would tend to tilt or cock the brake shoes and increase the stress concentrations in the various elements of the brake assembly. This balanced mounting of the brake shoe actuating mechanism and the advantages thereof will become more readily apparent from the subsequent description.

Movably mounted between the plate members 14 are the pair of arcuately shaped brake shoes 21. Each shoe 21 has a lined peripheral flange 22 that is adapted to be frictionally engaged with the inner axially extending, cylindrical braking surface 11 of the brake drum 10. Each shoe 21 also has a centrally disposed web portion 23 that is adapted to be connected to the shoe actuating mechanism. Each web portion 23 is pivotally connected at one of its ends to the plate members 14 by a pivoted link 41 and the other end of each shoe web portion 23 is connected to a fluid actuating motor 31 that is fixedly anchored in a pair of the aligned L-shaped seats 14a of the plates 14.

As the actuating mechanism for each of the brake shoes 21 is identical, only that for the left shoe will be described. Left brake shoe 21 has its web portion 23 at the upper or toe end connected to a plunger rod 32 that is adapted to be actuated by the movable piston 33 of fluid motor 31. Fluid motor 31 is the so-called wheel cylinder of a conventional hydraulic brake system. Motor 31 comprises the cup-shaped cylinder 34 within which the piston 33 is reciprocably mounted. Piston 33 is formed with a concave seat 33a adapted to be engaged by the rounded end 32a of plunger rod 32. Pressurized brake fluid is admitted to the bore of cylinder 34 through the port 35. Port 36 provides a bleed hole for draining brake fluid from the hydraulic brake system. The outer surface of motor cylinder 34 has a rearwardly extending ear 34a and a radially projecting spacer fin 34b both of which are adapted to be mounted between the support plates 14. Ear 34b is connected to plates 14 by the bolt 18. The ear 34a and the fin 34b are located so as to lie in a vertical plane through the center of the cylinder 34. This arrangement prevents the development of bending moments in plates 14 during application of the brakes. With this construction the brake reaction forces are transmitted along the center of the cylinder 34 which is mounted centrally between the pair of support plates 14 and the brake reaction is transmitted directly to the plates 14 as a compressive force rather than as a bending moment. Motor 31 is mounted in the L-shaped seats 14a in the edges of the plates 14 with the closed end 34c of the motor cylinder 34 abutting against the vertically disposed edges of the aligned seats 14a. These engaged surfaces thus provide a rigid, centered connection to take the brake reaction transmitted to the motor 31 from the shoes 21. The engagement of the closed end 34c of the cylinder 34 with the edges of the L-shaped seats 14a in the plates 14 relieves the bolt 18 of any brake reaction stresses. The bolt 18 is required to merely connect the motor 31 to the plates 14. When the brake assembly is detached from the supporting housing 13 the bolts 18 thus provide a means for retaining the elements of the brake assembly as a completely assembled unit which facilitates handling and installation.

The web 23 of left brake shoe 21, near the heel or lower end, is formed with the curved finger-like projection 23a that is adapted to seat in the concavely shaped mating formation 41a on one end of the pivot link 41. Link 41 extends in the same plane as the web 23 of shoe 21 and has its opposite end formed with a concavely shaped seat 41b which is adapted to be mounted on the washer-like anchor member 51 that is fixedly mounted between the plate members 14 by the rivet 52. The curved bearing seats between the shoe web 23, the pivoted link 41 and the plate supported anchor member 51 provide mating journal means that permit relative pivotal movement between these engaged elements. It will be noted that this construction eliminates separate anchor bolt connections to the housing 13. This arrangement thereby materially simplifies the brake assembly for only the bolts 19 and 20 need be removed and the complete brake assembly may then be removed as a unit from the housing support 13.

Figure 2:
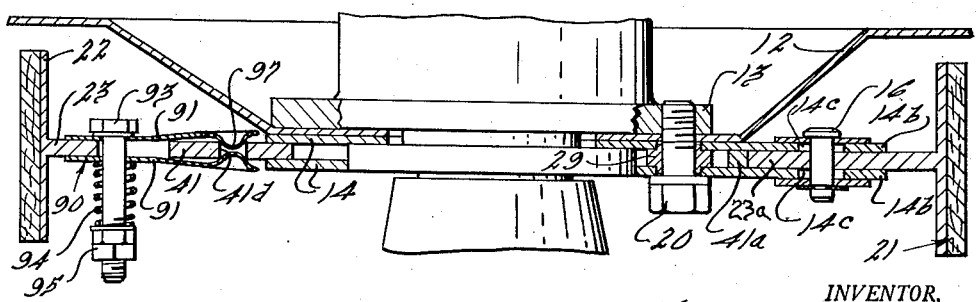
Fig. 2 is a sectional elevation taken along the line 2—2 of Fig. 1 clearly disclosing the arrangement of the brake shoes and the actuating linkage between the reaction absorbing brake shoe guide plates.

From Figs. 2, 3 and 6 it is thought to be obvious that a brake assembly has been provided in which the spaced apart brake shoe guiding plates 14 are adapted to also serve as the means for directly mounting the brake assembly on the brake assembly supporting member 13. This arrangement whereby the brake shoe actuating mechanism is located centrally between the plates 14 and supported thereon permits the plates 14 to directly resist the brake reaction. As the brake shoe actuating mechanism is centrally mounted between and supported by the plates 14 it is obvious that the brake reaction will be equally distributed between the spaced plates 14 and that the brake reaction will not develop bending moments in the plates or associated elements which would tend to tilt or cock the brake shoes or unnecessarily stress the various elements of the brake assembly. All forces generated during braking are transmitted in a plane that is parallel to and extends centrally between the plates 14 therefore the brake reaction develops direct compression loads or shear forces rather than eccentric loads which would cause bending moments in the plates 14 and associated elements. By reducing the stresses in the various elements of the assembly the size of the elements can be reduced and the complete brake assembly simplified and reduced in size and cost. In addition to the cylinder ears 34a and fins 34b, both of which serve as plate spacers, it will be noted that the brake shoe web portions 23a and 23b, as well as the anchor members 51 and the washer-like sleeves 29 for the bolts 19 and 20 also serve as spacers for the plates 14 and thereby provide a relatively rigid, positively, aligned, wheel brake assembly.

This brake assembly includes a simple, economically manufactured and assembled means for adjusting the clearance between the lined flanges 22 of the brake shoes and the braking surface 11 of the brake drum. This means comprises an eccentrically mounted adjusting means 60 (see Figs. 4 and 5) which consists of a square shank stud 61 having a cylindrical portion 62 attached thereto which latter portion is insertable through an opening in the dust plate 12 and through aligned openings in the support plates 14. The cylindrical portion 62 of the stud 61, located between the guide plates 14, has a cam portion 65 eccentrically mounted thereon. The side edge of cam 65 is adapted to engage an edge portion 23b of the brake shoe web portion 23 to provide means for camming of the shoe into adjusted position. The cam means 65, engaging the edges of the centrally disposed brake shoe web portion 23 which is mounted between the support plates 14, can not produce a turning moment that would tend to tilt or cock the engaged brake shoe therefore a balanced brake shoe clearance adjusting means is also provided.

Associated with the brake shoe clearance adjusting means 60 is a novel type of brake shoe return spring 71. The spring 71 is substantially diamond-shaped and has the free ends 71a thereof anchored in a hole 23d through the web portion 23 of the brake shoe 21. The bight portion 71b of the spring 71 is seated around a pin 67 that is carried by the brake shoe clearance adjusting stud 61. Spring 71 not only urges the brake shoe to a disengaged position but in addition resiliently urges the cam adjusting means 65 into engagement with the shoe web portion 23b. This combination brake shoe clearance adjusting means and return spring is more clearly described in the application of Robert F. Smith, Serial No. 111,461, filed August 20, 1949, which application relates to this specific form of brake shoe clearance adjusting and return spring device.

From the above description it is thought that it is obvious that the pivotally mounted, link supported brake shoe construction herein disclosed provides a self-energizing, self-aligning, brake that secures maximum braking efficiency with minimum pedal pressure and that it is a definite improvement on the construction specifically described in the U. S. patent to L. C. Huck No. 1,886,811. To insure that the brake shoe 21 will normally pivot about the anchor pivot members 51, rather than about the link pivot seat 41a, and to also assist in the guiding of the movement of the brake shoe, the spring-pressed guide means 90 is provided between the web 23 of the brake shoe 21 and the associated pivot link 41. This means 90 (see Fig. 2), for guiding the movement of the brake shoe and restraining relative pivotal movement between the brake shoe and pivot link, comprises a pair of friction plates 91 positioned against opposite sides of the brake shoe web portion 23 and the associated pivot link 41. Plates 91 are formed with aligned apertures through which a bolt 93 extends. Mounted on bolt 93 is a spring 94 which may be placed under compression by the nut and washer means 95 that is mounted on the threaded end of bolt 93. Compression of spring 94 presses the plates 91 against the sides of the brake shoe web portion 23 and against the sides of the pivot link 41 and thereby frictionally restrains relative movement between these members. Link 41 is formed with an aperture 41d in which depressed portions 97 of plates 91 are adapted to seat. The seating of portions 97 in the aperture 41d provides a pivot point about which the plates 91 may turn in the event conditions are such as to necessitate relative pivotal movement of the brake shoe with respect to the pivot link 41. The engaged portions 41d, 97 also prevent movement of the plates 91 along the link 41 and thereby retain the shoes and links in assembled position. It will be noted that the friction means 90 not only serves the dual function of restraining relative pivotal movement between the brake shoe 15 and pivot link 30 and also guiding the movement of the shoe 15, but in addition, it holds these associated members together and in alignment and tends to prevent cocking or tilting of the brake shoe. As a result of the friction plate construction for controlling relative pivotal movement of the link 30 and associated brake shoe, the angular relation of these members may vary to obtain the most effective frictional engagement between the shoe flange and the brake drum without the occurrence of undesired rotation of the pivot links 41. This principle is also explained in detail in the U. S. patent to L. C. Huck, No. 1,886,811.

Thus it will be seen that applicant has provided a guided shoe brake assembly that is highly efficient in braking operation, extremely easy and economical to manufacture and install, easily assembled, repaired or reconditioned due to the detachability of the complete brake shoe actuating mechanism, and free of torsional loads or turning moments that would tend to cock the brake shoes and create unnecessary stresses and strains in the elements of the brake assembly due to the disclosed arrangement of the brake shoe actuating means between the spaced apart reaction plates.

I claim:

1. In a brake, a rotatable brake drum having an axially extending braking surface, a fixed support, a pair of parallel, spaced apart reaction plate members mounted on said support so as to extend in a plane normal to the braking surface of said drum, a brake shoe having a lined flange portion arranged substantially concentrically within and adapted to be frictionally engaged with the braking surface of said drum, said shoe having a single web portion normal to said flange portion and disposed in a plane located centrally of the width thereof, said web having portions extending into the space between and guidingly supported by said plate member, an anchor member fixed to and arranged to extend transversely between said plates, a pivot link positioned between and guidingly supported by said plates, said link being pivotally connected between one end of the brake shoe web portion and said anchor member, and brake shoe actuating means having centrally arranged portions thereof positioned between and anchored to said plate members to space and rigidify said plate members, said actuating means including centrally disposed movable portions connected to the other end of said brake shoe web portion, said actuating means being adapted to apply a braking force to the centrally disposed web of said shoe in a plane extending parallel to and located centrally between said plate members whereby the plate members are adapted to directly resist the brake reaction during braking without developing bending stresses in the associated brake elements.

2. A brake as defined by claim 1 wherein the side edge of the brake shoe web portion is formed with a curved seat portion engageable with a complementary seat portion formed on an end edge of the pivot link so as to provide mating journal means for accommodating relative pivotal movement between the brake shoe, pivot link and anchor member.

3. A brake as defined by claim 1 including frictionally engaged plate means extending between and connecting the side surfaces of the brake shoe web portion and the pivot link to restrain relative movement between the shoe and link, said frictionally engaged means also providing means for guiding the movement of the brake shoe.

4. A brake as defined by claim 1 including an adjusting means for setting the clearance between the brake shoe and the brake drum when the shoe is in a retracted position, said adjusting means comprising a rotatable cam member mounted between the guide plates having edge portions thereof adapted to engage the centrally disposed side edge of the brake shoe web portion to exert a force in the plane of the web portion.

5. A brake as defined by claim 1 wherein the brake shoe actuating means comprises a fluid motor having portions thereof mounted in seats formed in the side edges of said plate members and including a projecting ear portion which extends between and spaces said plate members, said motor being provided with a centrally disposed movable plunger connected to the web of the brake shoe to exert a force in the plane of the web portion.

6. In a brake assembly, a rotatable brake drum having an interiorly disposed braking surface, a support, a pair of parallel, spaced-apart, torque plate members detachably connected to said support and arranged to extend in a plane normal to the braking surface of said drum, a pair of anchor members mounted between the plate members, a pair of diametrically arranged substantially L-shaped indentations formed in the side edges of each of said plate members, brake shoe actuating motors mounted in the L-shaped seats in the side edges of said plate members, fixed projections on said motors extending between said plates and connected to said plates, movable plunger members carried by said motors having force transmitting portions extending in a plane located between and parallel to said plate members, a pair of diametrically arranged brake shoes each having a flange portions disposed adjacent to and adapted to be frictionally engaged with the braking surface of said drum, said shoes each having a web portion extending normal to and disposed centrally of said flange portion, said web portions including portions arranged between said plate members to be guidingly embraced thereby, means connecting a web portion at one end of each shoe to a plunger member, a pair of links positioned between and guidingly supported by said plate members, each link having one end pivotally connected to the web portion at the other end of a shoe, the other end of each of said links being pivotally connected to an anchor member, resilient means connected between said plate members and each of said shoe web portions adapted to urge said shoes to retracted positions disengaged from said drum braking surface, and plate-like means frictionally engaged between said shoe web portions and said links to restrain relative pivotal movement between the shoes and links.

7. In a brake assembly, a rotatable brake drum having an annular braking surface, a support, a pair of parallel, spaced-apart torque plate members detachably connected to said support and arranged to extend in a plane normal to the braking surface of said drum, a pair of anchor members mounted between and carried by the plate members, a pair of diametrically arranged indentations formed in the side edges of each of said plate members, brake shoe actuating motors mounted in the indentations in the side edges of said plate members, fixed projections on said motors extending between said plates and connected to said plates to space and rigidify said plates, movable plunger members carried by said motors extending in a plane located between and parallel to said plate members, a pair of diametrically arranged brake shoes each having a flange portion adapted to be frictionally engaged with the braking surface of said drum and a web portion extending normal to and disposed centrally of said flange portion, said web portion having portions extending between said plate members to be guided thereby, means connecting a web portion at one end of each shoe to a plunger member, a pair of links positioned between said plate members, each link having one end pivotally connected to the web portion at the other end of a shoe, the other end of each of said links being pivotally connected to an anchor member.

8. In a brake assembly, a pair of parallel, spaced apart reaction plates adapted to be detachably mounted on a support, a pair of brake shoe actuating motors mounted on and arranged with centrally located portions thereof extending between and spacing said plates, a movable plunger member carried by each of said motors having a force transmitting portion arranged to extend in a plane centrally of said plates, a pair of brake shoes each having a single, centrally disposed, web portion positioned between said plates, means connecting one end of each brake shoe web portion to a force transmitting portion of a movable plunger member, a pair of anchor members mounted on and positioned between said plates, a pair of links positioned between and guidingly supported by said plates and arranged to pivotally connect the other end of each brake shoe web portion to an anchor member, spring means connected between said brake shoe web portions and said plates to urge said shoes towards retracted brake disengaged position, and friction engaged shoe guide means connected between each link and its pivotally engaged brake shoe web portion to restrain relative pivotal movement between these engaged members.

9. A brake assembly as defined by claim 8 including means for adjusting the maximum clearance between said drum and brake shoes comprising rotatable cam means mounted between said plates and having portions adapted to engage the side edges of the brake shoe web portions located between said plates to restrict movement of said brake shoes.

10. In a brake assembly, a pair of parallel, spaced apart, reaction plates adapted to be detachably mounted on a support, a pair of brake shoe actuating motors mounted on and arranged with centrally located portions thereof extending between and spacing said plates, a movable plunger member carried by each of said motors having a thrust transmitting portion arranged to extend in a plane centrally between said plates, a pair of brake shoes each having a web portion located centrally of the width of the braking flange and normal thereto positioned between said plates, means connecting one end of each brake shoe web portion to the thrust transmitting portion of a movable plunger member, a pair of anchor members mounted on and positioned between said plates, a pair of links positioned between and guidingly supported by said plates, said links having portions engaged with and arranged to pivotally connect the other end of each brake shoe web portion to an anchor member.

11. In a brake, a rotatable brake drum having an interior braking surface, a fixed support, a pair of parallel, spaced apart, plate members mounted on said support so as to extend in a plane normal to the braking surface of said drum, a brake shoe having a lined flange portion adapted to be frictionally engaged with the braking surface of said drum and a single web portion normal to said flange portion and positioned centrally of the width of said flange with portions thereof arranged to extend into the space between said plate members for guided movement relative thereto, an anchor member mounted on and arranged to extend between said plates, a pivot link positioned between said plates for guided movement relative thereto, said link having one end pivotally connected to the edge of one end of the brake shoe web portion and the other end pivotally connected to said anchor member, and brake shoe actuating means having fixed portions thereof positioned between and anchored to said plate member to space said plate, the actuating means movable portions thereof connected to the other end of said brake shoe web portion, said actuating means movable portions being arranged to apply a braking force to said shoe in a plane extending parallel to and located centrally between said plate members, the plate members being adapted to directly resist brake reaction during braking without the development of bending stresses in the brake elements.

12. In a brake, a rotatable brake drum having an interiorly disposed braking surface, a fixed support, a reaction element mounted on said support having a pair of spaced apart plate members mounted thereon so as to extend in a plane normal to the braking surface of said drum, a brake shoe having a lined flange portion adapted to be frictionally engaged with the braking surface of said drum and a single web portion disposed normal to and centrally of said flange portion having portions extending into the space between said plate members for guided movement relative thereto, an anchor member mounted on said plate members having portions arranged to extend across the space between said plates, a pivot link positioned between said plates for guided movement relative thereto, said link having the ends thereof pivotally connected between the brake shoe web portion and said anchor member, and brake shoe actuating means having centrally arranged portions thereof positioned between and anchored to said plate members to space said plates and movable portions thereof aligned with and connected to said brake shoe web portions, said actuating means being adapted to apply a braking force to said shoe in a plane extending parallel to and located centrally between said plate members, the plate members being adapted to directly resist the brake reaction during braking.

13. In a brake assembly, a rotatable brake drum having an annular braking surface, a support, a pair of spaced-apart, parallel, plate members detachably connected to said support and arranged to extend in a plane normal to the centrally disposed portion of the braking surface of said drum, a pair of anchor members mounted between and carried by the plate members, a pair of diametrically arranged substantially L-shaped indentations formed in the side edges of each of said plate members, brake shoe actuating motors mounted in the L-shaped seats in the side edges of said plate members, fixed projections on said motors extending between said plates to space said plates and connected to said plates to rigidify said plates, movable plunger members carried by said motors having force transmitting portions extending in a plane located between and parallel to said plate members, a pair of diametrically arranged brake shoes each having a flange portion arranged concentrically about and adapted to be frictionally engaged with the braking surface of said drum, said shoes each having a web portion extending normal to said flange portion and disposed in a plane located centrally of the width thereof, said webs each having portions arranged between said plate members and guidingly supported thereby, means connecting a web portion at one end of each shoe to a plunger member force transmitting portion, a pair of links positioned between said plate members, each link having one end pivotally connected to the web portion at the other end of a shoe, the other end of each of said links being pivotally connected to an anchor member, resilient means connected between said plate members and each of said shoe web portions adapted to urge said shoes to retracted drum disengaged positions, and guide plate means frictionally engaged between the side surfaces of said shoe web portions and said links to restrain relative pivotal movement between the shoes and links, and a pair of eccentrically mounted rotatable cams mounted on and positioned between said plate members, each cam having a force transmitting portion thereof adapted to engage the side edge of the web portion of one of the brake shoes located between said plate members to provide means for setting the clearance between the engageable braking surfaces of said shoes and said drum when said shoes are retracted, the location of said cams being such as to prevent the development of forces tending to cock the shoes.

14. In a brake assembly, a rotatable brake drum having an interiorly disposed braking surface, a support, a reaction element detachably connected to said support, said reaction element having a pair of spaced, parallel, plate members projecting therefrom and arranged to extend in a plane normal to the braking surface of said drum, a pair of anchor members mounted on and arranged to extend between the plate members, a pair of peripherally spaced indentations formed in the side edges of each of said plate members, brake shoe actuating motors mounted in the spaced indentations in the side edges of said plate members, said motors having projections on the central portions thereof connected to and extending between said plates so as to space said plates, movable plunger members mounted on and actuated by said motors having thrust members arranged to extend in a plane located between and parallel to said plate members, a pair of oppositely arranged brake shoes each having a flange portion adapted to be frictionally engaged with the braking surface of said drum and a web portion extending normal to and positioned centrally of the width of said flange portion, said web portion having portions thereof arranged between and embraced by said plate members for guided movement relative thereof, means connecting a web portion at one end of each shoe to a plunger thrust member, a pair of links positioned between said plate members for guided movement relative thereto, each link having one end journalled in and pivotally connected to an edge of the web portion at the other end of a shoe, the other end of each of said links being pivotally connected to an anchor member, resilient means connected between said plate members and each of said shoe web portions adapted to urge said shoes to retracted positions, and cam means mounted on and arranged to extend between and to be guidingly embraced by said plates having portions thereof arranged to engage the edges of the web portions of said brake shoes to adjust the clearance between said shoes and said drum.

JOHN P. BUTTERFIELD.

REFERENCES CITED

The following references are of record in the file of this patent:

UNITED STATES PATENTS

| Number | Name | Date |
| --- | --- | --- |
| 1,768,509 | Chase | June 24, 1930 |
| 1,860,959 | Schnell | May 31, 1932 |
| 2,082,229 | Stoner | June 1, 1937 |
| 2,365,715 | Mattersdorf | Dec. 26, 1944 |
| 2,380,814 | Whitacre | July 31, 1945 |

FOREIGN PATENTS

| Number | Country | Date |
| --- | --- | --- |
| 357,367 | Great Britain | Sept. 24, 1931 |